United States Patent

Segawa et al.

[11] Patent Number: 5,865,884
[45] Date of Patent: Feb. 2, 1999

[54] GLASS FORMING LUBRICANT AND GLASS FORMING METHOD USING IT

[75] Inventors: Yutaka Segawa; Yukio Morisawa, both of Funabashi; Ryoji Nishizawa, Aichi; Norio Doi, Toyoake, all of Japan

[73] Assignees: Asahi Glass Company Ltd., Tokyo; Chukyo Kasei Kogyo Co., Ltd., Nagoya, both of Japan

[21] Appl. No.: 850,110

[22] Filed: May 1, 1997

[30] Foreign Application Priority Data

May 8, 1996 [JP] Japan ................................. 8-113934

[51] Int. Cl.$^6$ ...................... C10M 139/00; C10M 137/06
[52] U.S. Cl. .............. 106/243; 106/287.19; 106/287.23; 65/24; 508/339; 508/435; 508/532; 508/533; 508/534; 508/539

[58] Field of Search .............................. 106/243, 287.19, 106/287.23; 508/339, 435, 532, 533, 534, 539; 65/24

[56] References Cited

U.S. PATENT DOCUMENTS 5,000,863  3/1991  Watanabe ............................... 252/42.7

OTHER PUBLICATIONS

CA 80:61006, Yamanaka et al, "Providing woolen textiles with soil resistant property" Nov. 17, 1972.

*Primary Examiner*—David Brunsman
*Attorney, Agent, or Firm*—Oblon, Spivak, McClelland, Maier & Neustadt, P.C.

[57] ABSTRACT

A glass forming lubricant comprising an organic titanate or an organic phospherous ester calcium salt as a lubricant agent.

14 Claims, 1 Drawing Sheet

GLASS FORMING LUBRICANT AND GLASS FORMING METHOD USING IT

BACKGROUND OF THE INVENTION

Field of the Invention

The present invention relates to a glass forming lubricant for press forming glass products such as a glass product for a cathode ray tube.

Discussion of Background

Glass forming lubricants (hereinafter referred to as lubricants) have been applied by hand by using a swabbing tool (a swab wound around a stick) because they are used at high temperatures of from 400° to 500° C. (the surface temperatures at the time of glass forming), or in the form of solid waxes. When supplying a swabbing tool with a lubricant, it has been common to put the swabbing tool into a conventional lubricant itself, which has a high viscosity (from about 10,000 to 20,000 cP at 25° C., measured with a B-type rotational viscometer, hereinafter measured in the same manner), for the subsequent application to a glass forming mold. A solid wax has been applied to part of a mold where a wax is needed. As a low viscosity lubricant, a solution of a lubricant diluted with a machine oil (usually machine oil 10) has been used.

It has been also conventional to vary intervals between applications to prevent problematic defects during glass forming such as smears on glass products (oil marks), checks, wrinkles and chills and to improve initial wrong operations of a press forming machine.

Since graphite is used for most conventional lubricants as the lubricating agent which impart lubricating effect to them, most conventional lubricants have appearances of black paste or black liquids. Such conventional lubricants can not provide a clean working environment, and lubricants of different colors have been demanded to improve a working environment. In addition, there has been chronic visual problems such as smears of graphite on glass products and poor surface properties of glass products resulting from partial stripping of a coating of a lubricant on the surface of a mold.

The object of the present invention is to solve the above-mentioned drawbacks of conventional lubricants, namely the problem that conventional lubricants containing graphite can not provide a working environment and leave smears of graphite on glass products, the operational problem that conventional lubricants are applied to a mold by hand and various defects of glass products such as checks, wrinkles and chills.

The lubricant of the present invention is free from graphite and therefore is a glass forming lubricant which has an appearance of a dark brown liquid. The lubricant of the present invention has an excellent effect that it can be applied by automatic atomization at room temperature by virtue of its low viscosity.

SUMMARY OF THE INVENTION

The present invention provides a glass forming lubricant comprising an organic titanate and/or an organic phosphorus ester calcium salt as a lubricating agent.

The present invention also provides a glass forming lubricant comprising the following components:
(A) a base oil which is a mineral oil, a synthetic oil, an animal or vegetable oil or fat or a synthetic ester,
(B) a lubricating agent,
(C) a thickener which is a high-molecular substance,
(D) a binder substance,
(E) an adhesive and dispersive additive, and
(F) a fast burning additive.

A preferred embodiment of the present invention is a glass forming lubricant according to the second aspect, which comprises:
(A) from 10 to 80 parts by weight of the base oil,
(B) from 2 to 20 parts by weight of the lubricating agent,
(C) from 2 to 40 parts by weight of the thickener,
(D) from 3 to 15 parts by weight of a lanolin fatty acid metal salt as the binder substance,
(E) from 3 to 40 parts by weight of the adhesive and dispersive additive, and
(F) from 1 to 3 parts by weight of the fast burning additive.

Another preferred embodiment of the present invention comprises from 2 to 20 parts by weight of an organic titanate or from 3 to 15 parts by weight of an organic phosphorus ester calcium salt as the lubricating agent (B).

Still another preferred embodiment of the present invention comprises from 5 to 20 parts by weight of a synthetic lubricating derived ester, from 2 to 15 parts by weight of a synthetic lubricating wax or from 5 to 40 parts by weight of a saturated hydrocarbon resin as the thickener (C).

Another preferred embodiment of the present invention comprises from 3 to 10 parts by weight of a higher alcohol or from 5 to 40 parts by weight of a lanolin alcohol as the adhesive and dispersive additive (E).

The present invention also provides a glass forming method for producing a glass product which is characterized by use of a lubricant comprising an organic titanate and/or an organic phosphorus ester calcium salt as a lubricating agent.

A preferred embodiment of the glass forming method of the present invention is characterized by use of a lubricant comprising the following components (A) to (F):
(A) a base oil which is a mineral oil, a synthetic oil, an animal or vegetable oil or fat or a synthetic ester,
(B) a lubricating agent,
(C) a thickener which is a high-molecular substance,
(D) a binder substance,
(E) an adhesive and dispersive additive, and
(F) a fast burning additive.

Still another preferred embodiment of the glass forming method of the present invention is characterized by use of a lubricant comprising
(A) from 10 to 80 parts by weight of the base oil,
(B) from 2 to 20 parts by weight of the lubricating agent,
(C) from 2 to 40 parts by weight of the thickener,
(D) from 3 to 15 parts by weight of a lanolin fatty acid metal salt as the binder substance,
(E) from 3 to 40 parts by weight of the adhesive and dispersive additive, and
(F) from 1 to 3 parts by weight of the fast burning additive.

DETAILED DESCRIPTION OF THE PREFERRED EMBODIMENTS

Figure 1:
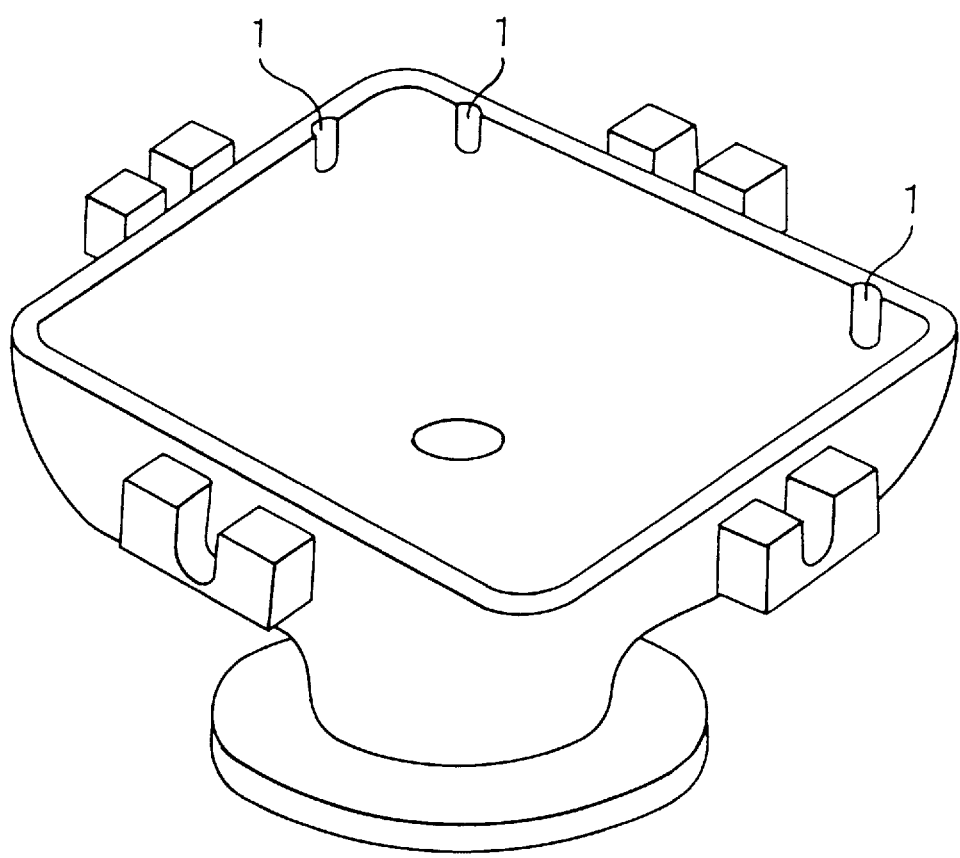
FIG. 1 is the perspective view of the glass forming bottom mold for glass funnels for a cathode ray tube used in Examples of the present invention.

As the mineral oil (A) to be used in the present invention, oils obtained by petroleum refining are preferred, and paraffinic, naphthenic or aromatic mineral oils obtained by refining crude oils, or mixtures thereof are preferred. Specifically, mineral oils such as machine oil, turbine oil, motor oil, bright stock and mixtures thereof are more preferred.

As the synthetic oil, a low viscosity α-olefin oligomer-type hydrocarbon synthetic oil and a low viscosity ethylene-α-olefin cooligomer-type hydrocarbon synthetic oil are preferred.

As the animal or vegetable fat or oil, low viscosity vegetable oils such as a low viscosity rapeseed oil, a low viscosity linseed oil or a low viscosity castor oil and low viscosity animal oils such as a low viscosity lard and a low viscosity sperm oil are preferred.

As the synthetic ester, low viscosity neopentyl polyol esters, low viscosity butanol esters of α-olefin-dibasic acid copolymers and low viscosity diesters are preferred.

The low viscosity used in the above means a viscosity within a range of from 10 to 32 mm$^2$/S at 40° C. Since the viscosity of the base oil greatly affects the viscosity of the resulting lubricant, the above-mentioned viscosity range enables automatic atomization of the resulting glass forming lubricant and is thus preferred.

The preferred composition or amount for a glass forming lubricant is, in the case of a mineral oil mixture of machine oil 10 and turbine oil 32, from 35 to 70 parts by weight.

The lubricating agent (B) is a additive which deposits on a mold and exerts a lubricating effect when molten glass is fed into the mold.

Specific examples of a preferable lubricating agent are, in the case of an organic titanate additive, tetraisopropoxytitanium, tetra-n-butoxytitanium, tetrakis(2-ethylhexyloxy)titanium, tetrastearyloxytitanium, diisopropoxy·bis(acetylacetonato)titanium, di-n-butoxy·bis(triethanolaminato)titanium, titanium isopropoxyoctylene glycolate and titanium stearate.

In the case of an organic phosphorus ester or its metal salt, as organic phosphorus esters, acid phosphate esters (such as methyl acid phosphate, ethyl acid phosphate, isopropyl acid phosphate, butyl acid phosphate, 2-ethylhexyl acid phosphate, isodecyl acid phosphate, lauryl acid phosphate, tridecyl acid phosphate, stearyl acid phosphate, oleyl acid phosphate, di-2-ethylhexyl phosphate and monoisodecyl phosphate) may be mentioned.

As metal salts of organic phosphorus esters, metal salts of acid phosphate esters (such as magnesium stearyl phosphate, aluminum stearyl phosphate, calcium stearyl phosphate and barium stearyl phosphate) and alkyl polyoxyethylene acid ester calcium salts may be mentioned.

Mixtures of at least one of them, mixtures of at least one of them with calcium carbonate and mixtures of at least one of them with calcium carbonate and at least one of the calcium, barium or magnesium salt of petroleum sulfonic acid and calcium salt of boric acid may also be mentioned.

An organic titanium salt is particularly preferred for a glass forming lubricant, and is added in an amount of from 2 to 20 parts by weight. A mixture of an alkyl polyoxyethylene phosphate ester calcium salt, the calcium salt of petroleum sulfonic acid and calcium carbonate is also preferred in view of a working environment, and is added in an amount of from 3 to 10 parts by weight.

The high molecular thickener (C) increases and adjusts the viscosity of the mineral oil so as to be stable for the deposition and automatic atomization.

Specific examples of a preferable thickener is, in the case of a synthetic lubricating derived ester, organic acid esters (for example, diesters such as dioctyl adipate, dioctyl azelate, diisooctyl adipate, diisodecyl adipate, diisotridecyl adipate, dioctyl sebacate, dibutyl sebacate, dibutyl adipate, a trimellitic acid ester and a tetraester, and polyol esters such as trimethylol polyol fatty acid esters, pentaerythritol polyol fatty acid esters and neopentyl polyol fatty acid esters) and maleic anhydride-modified (ethylene or α-olefin copolymer)-type synthetic lubricating esters may be mentioned. More preferred is a maleic anhydride-modified synthetic lubricating esters and is added in an amount of from 5 to 10 parts by weight.

As synthetic lubricating derived waxes, ester waxes, partially saponified waxes, polyolefin waxes, polyethylene waxes, polypropylene waxes and maleic anhydride copolymer-mixed waxes may be mentioned. Particularly preferred are a maleic anhydride copolymer-mixed waxes and added in an amount of from 3 to 5 parts by weight.

In the case of a saturated hydrocarbon resin, an alkyd resin, an acrylic resin, a rosin resin, a rosin-modified synthetic resin, a rosin-modified maleic acid resin, a rosin-modified phenolic resin, an amino resin, a rosin ester, a hydrogenated rosin ester, a rosin pentaerythritol ester or an alicyclic saturated hydrocarbon resin may be mentioned. Particularly preferred are an alicyclic saturated hydrocarbon resin, an rosin ester and a hydrogenated rosin ester. The amount is from 5 to 10 parts by weight.

The binder substance (D) is miscible with the lubricating agent (B) to form a lubricant coating and has an effect of improving the strength and the lubricating property of the coating every time the lubricant of the present invention is applied to a mold.

Preferred are lanolin fatty acid metal salts, and specific examples are lanolin fatty acid calcium salt, lanolin fatty acid barium salt, lanolin fatty acid zinc salt, and mixtures thereof or a mixture of such a metal salt with at least one member selected from the group consisting of lanolin, a lanolin alcohol, a lanolin fatty acid polyol, a lanolin fatty acid lower alcohol, calcium petroleum phosphate, barium petroleum sulfate and magnesium petroleum sulfonate.

Particularly preferred is a mixture of lanolin fatty acid calcium salt, lanolin fatty acid zinc salt and barium petroleum sulfonate. The amount is from 3 to 5 parts by weight.

The adhesive dispersive additive (E) has an effect of spreading the lubricating agent and the binder substance in a mold to disperse them uniformly before they deposit to form a lubricant coating.

Fatty acid alcohols having a carbon number of from 8 to 24, especially higher alcohols having a carbon number of 12 to 24 are preferred. In the case of a linear saturated alcohol, octyl alcohol, nonyl alcohol, decyl alcohol, lauryl alcohol, myristyl alcohol, cetyl alcohol, stearyl alcohol and behenyl alcohol may be specifically mentioned, and in the case of a linear unsaturated alcohol, oleyl alcohol may be mentioned.

In the case of a branched fatty acid alcohol, branched alcohols such as a isolauryl alcohol, isocetyl alcohol, isostearyl alcohol, octyldodecanol and 2-decyl-tetradecanol may be mentioned.

In the case of a natural alcohol, those derived from natural oils such as tallow, coconut oil, palm oil and olive oil may be mentioned.

Among them, branched fatty acid alcohols are particularly preferred, and the amount is from 3 to 5 parts by weight.

In the case of a lanolin alcohol, a mixed alcohol obtained by saponification of lanolin about in a 50% yield may be mentioned, and the amount is from 5 to 15 parts by weight.

The fast burning additive (F) has an effect of helping the resulting lubricant evaporate and catch fire so that each component of the lubricant deposit quickly on a lubricant coating.

Kerosine, high boiling kerosine and hydrogenated kerosine, hydrogenated high-boiling kerosine, and their mixtures with a mineral oil which may further contain an additive for fuel may be mentioned. The amount is from 1 to 3 parts by weight. The above-mentioned additive for fuel consists of an organic solvent, a mineral oil and an additive, and has an effect of making the fast burning additive more ignitable. The additive in the additive for fuel stabilizes the additive for fuel (the organic solvent and the mineral oil), and corresponds to an antioxidant, a corrosion inhibitor, a metal deactivator for lubricating oils, a detergent or a flowability enhancer. The particularly preferred fast burning additive is a mixture of high boiling kerosine and an mineral oil which contains an antioxidant and a metal deactivator for lubricating oils. The high boiling kerosine preferably has a flash point of 80° C. or above to accelerate the ignition at a high temperature so as to form a lubricant coating quickly and decrease oil marks.

A preferred lubricant according to the present invention can be obtained by mixing the above-mentioned respective components (A) to (F). One of its features is that it contains an organic titanate and/or an organic phosphorus ester calcium salt as the lubricating agent and is virtually free from graphite which is contained in conventional lubricants as the main component of the lubricating agent. However, components other than (A) to (F) may be incorporated, and a small amount of graphite may be contained as a lubricating agent so long as the performance of the lubricant is not impaired.

The viscosity of the lubricant heavily depends on temperature. The acceptable range of the viscosity is from 1 to 1,000 cP at room temperature (25° C.). In particular, when the lubricant is applied automatically to the molding surface of an mold, for example, by spraying, a relatively low viscosity around from 100 to 300 cP is preferable. If the viscosity is higher than 300 cP, smooth and reliable automatic application is difficult. On the other hand, if the viscosity is lower than 100 cP, a desired lubricant coating can not be formed on the molding surface of a mold in the case that high molding accuracy is required for in the case of a glass product of a complicated shape.

In order for the lubricant coating to exhibit satisfactory lubricating performance, it is important to deposit the oxidized solid lubricating agent and the metal salt uniformly on the molding surface of a mold. The base oil (A), the high-molecular thickener (C), the binder substance (D), the adhesive and dispersive additive (E) and the fast burning additive (F) vaporize evaporate or burn at about 500° C., leaving little traces. They have a subsidiary function to uniformly deposit the oxidized solid lubricating agent and the metal salt on a mold and to form a strong lubricant coating. Therefore, when the molding requirements such as the type and the shape of the glass product or the molding accuracy are moderate, the thickener, the adhesive and dispersive additive or the fast burning additive may be omitted.

When the lubricant is used in production of a glass product, it is applied to the whole or selected part of the molding surface of a mold to form a lubricant coating, and then the mold is filled with molten glass for glass forming. At the time of glass forming, immediately after the lubricant is applied to the molding surface of a mold to uniformly deposit and disperse on the surface of the mold, which is at a high temperature of from 450° to 550° C., the oily components in the lubricant evaporate or burn in a moment so that the solid components form a strong lubricant coating having lubricating property.

The lubricant may be applied by hand, but is usually applied by automatic atomization. The lubricant, once applied, forms such a durable lubricant coating as lasts during several repetitions of the forming process. Therefore, the lubricant may be applied at a constant interval only when the lubricant coating gets to perform unsatisfactorily or no longer.

The above-mentioned lubricant comprising (A) to (F) can prevent formation of defects such as scuffs, checks in press forming glass products for a cathode ray tube (such as a front panel and a funnel) to give products with fewer smears and surface irregularities, and has an excellent effect on not only the quality but also the yield of the product as compared with conventional lubricants.

The lubricant of the present invention is used in production of glass products by press forming, and is useful not only as a lubricant for glass products for a cathode ray tube but also as a lubricant for glass bottles for food, cosmetics and beverages.

EXAMPLE 1

A lubricant comprising the following components (A) to (F) was prepared: about 55 parts by weight of a mineral oil mixture of machine oil 10 and turbine oil 32 as the component (A), about 4 parts by weight of titanium acetate as the component (B), about 15 parts by weight of a mixture of a maleic anhydride-modified synthetic lubricating ester, a maleic anhydride copolymer mixed wax and an alicyclic saturated hydrocarbon resin as the component (C), about 4 parts by weight of a mixture of lanolin fatty acid calcium, lanolin fatty acid zinc and barium petroleum sulfonate as the component (D), about 15 parts by weight of a lanolin alcohol and a branched fatty acid alcohol as the component (E) and about 1 part by weight of a mixture of a high boiling kerosine [a flash point of 80° C., measured by the COC method (the Cleaveland Open Cup Method)] and a mineral oil which further contained an antioxidant and a metal deactivator for lubricating oils as the component (F).

By using the lubricant of Example 1, glass funnels for a cathode ray tube were produced by press forming for 10 days to determine the rate of formation of surface defects (scuffs, checks, smears and mold marks) on the glass funnels against a pad segment 1 (shown in FIG. 1) of a bottom mold.

The lubricant was applied with a double fluid microatomization nozzle under predetermined conditions (lubricant pressure=2 kg/cm$^2$, outlet air pressure=3 kg/cm$^2$, application interval=15 minutes and application time=0.08 second), because it would have been difficult to reproduce the same application conditions by hand, for example, with a swabbing tool.

The rate of formation of surface defects was found to be 0.01% (scuffs=0%, checks=0%, smears=0% and mold marks=0.01%), and thus the lubricant gave good results in respect of quality and yield.

EXAMPLE 2

A lubricant comprising the following components (A) to (F) was prepared: about 55 parts by weight of a mineral oil mixture of machine oil 10 and turbine oil 32 as the component (A), about 4 parts by weight of an alkyl polyoxyethylene phosphate ester calcium as the component (B), about 15 parts by weight of a mixture of a maleic anhydride-modified synthetic lubricating ester, a maleic anhydride copolymer mixed wax and an alicyclic saturated hydrocarbon resin as the component (C), about 4 parts by Ad weight of a mixture of lanolin fatty acid calcium, lanolin fatty acid zinc and barium petroleum sulfonate as the component (D), about 15 parts by weight of a lanolin alcohol and a branched fatty acid alcohol as the component (E), and about 1 part by weight of a mixture of a high boiling kerosine (flash point 80° C., measured by the COC method) and a mineral oil which contained an antioxidant and a metal deactivator for lubricating oils as the component (F).

By using the lubricant of Example 2, the rate of formation of surface defects on glass funnels was determined in the same manner as in Example 1, and found to be 0.02% (scuffs=0%, checks=0%, smears=0.01% and mold marks=0.01%). Thus, the lubricant produced good results in respect of quality and yield.

EXAMPLE 3

A lubricant comprising the following components (A) to (F) was prepared: about 55 parts by weight of a mineral oil mixture of machine oil 10 and turbine oil 32 as the component (A), about 10 parts by weight of a mixture of titanium acetate, an alkyl polyoxyethylene phosphate ester calcium, calcium petroleum sulfonate and calcium carbonate as the component (B), about 10 parts by weight of a maleic anhydride-modified type as the component (C), about 4 parts by weight of a mixture of lanolin fatty acid calcium, lanolin fatty acid zinc and barium petroleum sulfonate as the component (D), about 15 parts by weight of a lanolin alcohol and a branched fatty acid alcohol as the component (E), about 1 part by weight of a mixture of a high boiling kerosine (flash point 80° C., measured by the COC method) and a mineral oil to which further contained an antioxidant and a metal deactivator for lubricating as the component (F).

By using the lubricant of Example 3, the rate of formation of surface defects on glass funnels was determined in the same manner as in Example 1 and found to be 0.01% (scuffs=0%, checks=0%, smears=0% and mold marks=0.01%). Thus, the lubricant produced good results in respect of quality and yield.

EXAMPLE 4

A lubricant comprising the following components (A) to (F) was prepared: about 55 parts by weight of a mineral oil mixture of machine oil 10 and turbine oil 32 as the component (A), about 10 parts by weight of a mixture of titanium acetate, an alkyl polyoxyethylene phosphate ester calcium, calcium petroleum sulfonate and calcium carbonate as the component (B), about 5 parts by weight of a maleic anhydride polymer mixed wax as the component (C), about 4 parts by weight of a mixture of lanolin fatty acid calcium, lanolin fatty acid zinc and barium petroleum sulfonate as the component (D), about 15 parts by weight of a lanolin alcohol and a branched fatty acid alcohol as the component (E), about 1 part by weight of a mixture of a high boiling kerosine (flash point 80° C., measured by the COC method) and a mineral oil which further contained an antioxidant and a metal deactivator for lubricating oils as the component (F).

By using the lubricant of Example 4, the rate of formation of surface defects on glass funnels was determined in the same manner as in Example 1 and found to be 0.01% (scuffs=0%, checks=0%, smears=0% and mold marks=0.01%), and thus the lubricant produced good results in respect of quality and yield.

EXAMPLE 5

A lubricant comprising the following components (A) to (F) was prepared: about 55 parts by weight of a mineral oil mixture of machine oil 10 and turbine oil 32 as the component (A), about 10 parts by weight of a mixture of titanium acetate, an alkyl polyoxyethylene phosphate ester calcium, calcium petroleum sulfonate and calcium carbonate as the component (B), about 10 parts by weight of an alicyclic saturated hydrocarbon resin as the component (C), about 4 parts by weight of a mixture of lanolin fatty acid calcium, lanolin fatty acid zinc and barium petroleum sulfonate as the component (D), about 15 parts by weight of a lanolin alcohol and a branched fatty acid alcohol as the component (E), and about 1 part by weight of a mixture of a high boiling kerosine (flash point 80° C., measured by the COC method) and a mineral oil which further contained an antioxidant and a metal deactivator for lubricating oils as the component (F).

By using the lubricant of Example 5, the rate of formation of surface defects on glass funnels was determined in the same manner as in Example 1 and found to be 0.01% (scuffs=0%, checks=0%, smears=0% and mold marks=0.01%), and the lubricant produced good results in respect of quality and yield.

EXAMPLE 6

A lubricant comprising the following components (A) to (F) was prepared: about 55 parts by weight of a mineral oil mixture of machine oil 10 and turbine oil 32 as the component (A), about 10 parts by weight of a mixture of titanium acetate, an alkyl polyoxyethylene phosphate ester calcium, calcium petroleum sulfonate and calcium carbonate as the component (B), about 10 parts by weight of an alicyclic saturated hydrocarbon resin as the component (C), about 4 parts by weight of a mixture of lanolin fatty acid calcium, lanolin fatty acid zinc and barium petroleum sulfonate as the component (D), about 5 parts by weight of 2-decyltetradecanol as the component (E), and about 1 part by weight of a mixture of a high boiling kerosine (flash point 80° C., measured by the COC method) and a mineral oil which further contained an antioxidant and a metal deactivator for lubricating oils as the component (F).

By using the lubricant of Example 6, the rate of formation of surface defects on glass funnels was determined in the same manner as in Example 1 and found to be 0.02% (scuffs=0%, checks=0%, smears=0.01% and mold marks=0.01%), and thus the lubricant produced good results in respect of quality and yield.

EXAMPLE 7

A lubricant comprising the following components (A) to (F) was prepared: about 55 parts by weight of a mineral oil mixture of machine oil 10 and turbine oil 32 as the component (A), about 10 parts by weight of a mixture of titanium acetate, an alkyl polyoxyethylene phosphate ester calcium, calcium petroleum sulfonate and calcium carbonate as the component (B), about 10 parts by weight of an alicyclic saturated hydrocarbon resin as the component (C), about 4 parts by weight of a mixture of lanolin fatty acid calcium, lanolin fatty acid zinc and barium petroleum sulfonate as the component (D), about 15 parts by weight of a lanolin alcohol as the component (E), and about 1 part by weight of a mixture of a high boiling kerosine (flash point 80° C., measured by the COC method) and a mineral oil which further contained an antioxidant and a metal deactivator for lubricating oils as the component (F).

By using the lubricant of Example 7, the rate of formation of surface defects on glass funnels was determined in the same manner as in Example 1 and found to be 0.01% (scuffs=0%, checks=0%, smears=0% and mold marks= 0.01%), and thus the lubricant produced good results in respect of quality and yield.

EXAMPLE 8
(Comparative Example)

For comparison, a conventional lubricant comprising about 15 parts by weight of a mineral oil (having a viscosity of about 230 mm$^2$/s at 40° C.), about 57 parts by weight of a high-molecular ester (a mixture of an ester type montan wax and a maleic polybutene) as a thickener, about 5 parts by weight of an organic sulfur ester (sulfur lard and a di-tert-nonylpolysulfide) and sulfur powder as a binder substance, about 20 parts by weight of a mixture of a high-molecular ester metal salt (calcium stearate) as an adhesive and dispersive additive, and about 3 parts by weight of graphite as a lubricating agent component, was prepared.

Then, by using this lubricant, glass funnels for a cathode ray tube were produced by press forming for 10 days to determine the rate of formation of surface defects (scuffs, checks, smears and mold marks) on the produced glass funnels against a pad segment 1 (FIG. 1) of the bottom mold for comparison of rate of formation of surface defects.

The lubricant was applied with a double fluid microatomization nozzle under predetermined conditions (lubricant pressure=2 kg/cm$^2$, outlet air pressure=3 kg/cm$^2$, application interval=15 minutes and application time=0.08 second), because it would have been difficult to reproduce the same application conditions by hand, for example, with a swabbing tool.

When the conventional lubricant was used, the rate of formation of surface defects was 0.6% (scuffs=0%, checks= 0%, smears=0.4% and mold marks=0.2%).

The present invention has an excellent effect that a working environment is unlikely to become dirty because it does not use a conventional lubricant comprising graphite as a main component, and also has an excellent effect in respect of both quality and yield. In addition, since the lubricant of the present invention has a low viscosity, it can be applied by automatic atomization and thus has an improving effect on operating efficiency and operations.

What is claimed is:

1. A glass forming lubricant comprising a mixture of an organic titanate, an organic phosphorus ester or its metal salt, a Ca, Ba or Mg salt of petroleum sulfonic acid and CaCO$_3$, as a lubricating agent.

2. The glass forming lubricant according to claim 1, which comprises a mixture of titanium acetate, alkyl polyoxyethylene phosphate ester Ca salt, Ca salt of petroleum sulfonic acid and CaCO$_3$ as the lubricating agent.

3. The glass forming lubricant according to claim 1, wherein said metal salt is an organic phosphorous ester calcium salt.

4. A glass forming lubricant comprising the following components:
   (A) a base oil which is a mineral oil, a synthetic oil, an animal or vegetable oil or fat or synthetic ester,
   (B) a lubricating agent comprising an organic titanate or an organic phosphorous ester or a metal salt of said organic phosphorous ester or mixtures thereof,
   (C) a thickener which is a high-molecular substance,
   (D) a binder substance,
   (E) an adhesive and dispersive additive, and
   (F) a fast burning additive.

5. The glass forming lubricant according to claim 4, which comprises:
   (A) from 10 to 80 parts by weight of the base oil,
   (B) from 2 to 20 parts by weight of the lubricating agent,
   (C) from 2 to 40 parts by weight of the thickener,
   (D) from 3 to 15 parts by weight of a lanolin fatty acid metal salt as the binder substance,
   (E) from 3 to 40 parts by weight of the adhesive and dispersive additive, and
   (F) from 1 to 3 parts by weight of the fast burning additive.

6. The glass forming lubricant according to claim 5, which comprises from 5 to 20 parts by weight of a synthetic lubricating derived ester, from 2 to 15 parts by weight of a synthetic lubricating wax or from 5 to 40 parts by weight of a saturated hydrocarbon resin, as the thickener (C), the parts by weight being based on the total weight of the lubricant.

7. The glass forming lubricant according to claim 5, which comprises from 3 to 10 parts by weight of a higher alcohol or from 5 to 40 parts by weight of a lanolin alcohol as the adhesive and dispersive additive (E).

8. A glass forming method for producing a glass product which comprising using the glass forming lubricant of claim 4.

9. A glass forming method according to claim 8, which is characterized by use of a lubricant comprising the following components (A) to (F):
   (A) a base oil which is a mineral oil, a synthetic oil, an animal or vegetable oil or fat or a synthetic ester,
   (B) a lubricating agent comprising an organic titanate and/or an organic phosphorus ester calcium salt,
   (C) a thickener which is a high-molecular substance,
   (D) a binder substance,
   (E) an adhesive and dispersive additive, and
   (F) a fast burning additive.

10. The glass forming method according to claim 9, wherein the lubricant comprises:
   (A) from 10 to 80 parts by weight of the base oil,
   (B) from 2 to 20 parts by weight of the lubricating agent,
   (C) from 2 to 40 parts by weight of the thickener,
   (D) from 3 to 15 parts by weight of a lanolin fatty acid metal salt as the binder substance,
   (E) from 3 to 40 parts by weight of the adhesive and dispersive additive, and
   (F) from 1 to 3 parts by weight of the fast burning additive.

11. The glass forming method according to claim 8, wherein the glass product is for a cathode ray tube.

12. The glass forming method according to claim 9, wherein the glass product is for a cathode ray tube.

13. The glass forming method according to claim 10, wherein the glass product is for a cathode ray tube.

14. The glass forming lubricant according to claim 4, which comprises:
   (A) about 55 parts by weight of a mineral oil mixture of machine oil and turbine oil;
   (B) about 4 parts by weight of titanium acetate;
   (C) about 15 parts by weight of a mixture of a malic anhydride-modified synthetic lubricating ester, a malic anhydride copolymer mixed wax and an alicyclic saturated hydrocarbon resin;

(D) about 4 parts by weight of a mixture of lanolin fatty acid calcium, lanolin fatty acid zinc and barium petroleum sulfonate;

(E) about 15 parts by weight of a lanolin alcohol and a branched fatty acid alcohol; and (F) about 1 part by weight of a mixture of a high boiling kerosene and a mineral oil comprising an antioxidant and a metal deactivator for lubricating oils.

* * * * *